United States Patent [19]
Geiss et al.

[11] Patent Number: 5,353,228
[45] Date of Patent: Oct. 4, 1994

[54] RANGE-FINDING METHOD AND APPARATUS

[75] Inventors: Wolfgang Geiss; Harald Heinrich, both of Aalen; Joachim Heppner, Oberkochen, all of Fed. Rep. of Germany

[73] Assignee: Carl-Zeiss-Stiftung, Heidenheim/Brenz, Oberkochen, Fed. Rep. of Germany

[21] Appl. No.: 841,984

[22] Filed: Feb. 26, 1992

[30] Foreign Application Priority Data

Mar. 5, 1991 [DE] Fed. Rep. of Germany ....... 4106892

[51] Int. Cl.⁵ .................... G01B 21/00; G01C 3/08
[52] U.S. Cl. .................... 364/458; 364/561; 356/5
[58] Field of Search ............ 364/458, 561, 560, 569, 364/713, 715.08; 356/5; 250/227.21

[56] References Cited

U.S. PATENT DOCUMENTS

| | | | |
|---|---|---|---|
| 4,344,705 | 8/1982 | Kompa et al. | 356/5 |
| 4,640,613 | 2/1987 | Yokoyama et al. | 356/1 |
| 4,699,508 | 10/1987 | Bölkow et al. | 356/5 |
| 4,788,441 | 11/1988 | Laskowski | 356/5 |
| 4,860,228 | 8/1989 | Carroll | 364/561 |
| 4,928,152 | 5/1990 | Gerardin | 356/5 |
| 4,930,094 | 5/1990 | Luitje et al. | 364/561 |
| 4,939,476 | 7/1990 | Crawford | 330/59 |
| 4,942,561 | 7/1990 | Ohishi et al. | 356/5 |
| 4,968,880 | 11/1990 | Beller | 250/227.21 |
| 4,969,113 | 11/1990 | Nishibe et al. | 364/569 |
| 5,036,477 | 7/1991 | Forster et al. | 364/561 |
| 5,046,839 | 9/1991 | Krangle | 356/5 |
| 5,056,914 | 10/1991 | Kollodge | 356/5 |
| 5,075,878 | 12/1991 | Ohtomo et al. | 346/569 |
| 5,095,452 | 3/1992 | Kanemaru | 364/561 |
| 5,107,449 | 4/1992 | Ikuta | 364/561 |
| 5,153,664 | 10/1992 | Besesty et al. | 356/5 |
| 5,224,128 | 6/1993 | Grallert | 375/104 |

FOREIGN PATENT DOCUMENTS 3620226  7/1987  Fed. Rep. of Germany.

OTHER PUBLICATIONS

Review of Scientific Instruments (Dec. 1983) "Circuit for Time-Resolved Photon Counting", Kyle, et al.
"Laser Handbook", vol. 2, edited by F. T. Arecchi and E. O. Schulz-Dubois, North Holland Publishing Company, 1972, pp. 1783–1787.

Primary Examiner—Thomas G. Black
Assistant Examiner—Tan Q. Nguyen
Attorney, Agent, or Firm—Hopgood, Calimafde, Kalil & Judlowe

[57] ABSTRACT

A method for target-range measurement of round-trip transit time, for laser light pulses transmitted from the rangefinder and target-reflected back to a measuring device, is based on the fact that a predetermined measurement cycle is subdivided into time intervals and that, in each time interval, it is recorded whether a reflected light pulse has or has not arrived. A system for carrying out the method is characterized by the fact that, instead of totalizing counter modules, successive storage locations in a serial memory device are sequentially indexed under clock-pulse control and, depending upon the time at which a target-reflected pulse is detected, a logic signal is supplied for storage at the instantaneously receptive location within the memory device. Signal-evaluation apparatus including a microprocessor is connected to the memory device to evaluate range from the memory location at which the logic signal is found.

6 Claims, 2 Drawing Sheets

RANGE-FINDING METHOD AND APPARATUS

BACKGROUND OF THE INVENTION

The present invention relates to a range-finding method in which light pulses are sent to a remote target, and in which the round-trip transit time of a target-reflected light pulse is measured; the invention also relates to apparatus for carrying out this method.

Optoelectronic rangefinders, for example laser rangefinders, send out coherent light pulses which are target-reflected back to the rangefinder. The distance to the target is determined by measuring the elapsed time between transmission of the laser-light pulse and return of the target-reflected laser-light pulse to the receiving device of the laser rangefinder; the distance to the target is calculated by an associated electronic system. In accordance with the known state of the art, at least one counter is started upon the emission of a pulse of laser light in order to effect this calculation. This counter totalizes the number of time intervals which elapse until the arrival of a light pulse reflected by the target. The counter is stopped upon the arrival of the light pulse. In the event different targets give rise to range-finder reception of several reflected-light pulses for a given transmitted pulse, several counters which were started upon the emission of the light pulse can be stopped, one after the other. Such a method of measurement and an arrangement for carrying out the method are to be found in the publication, "Laser Handbook", Vol. 2, edited by F. T. Arecchi and E. O. Schulz-Dubois, North Holland Publishing Company, 1972, pages 1783–1787.

This known prior art has the disadvantage that use of conventional counter modules necessitates memory storage of intermediate counter values with the full resolution of the counter (for example, 16 bit). The transfer of the intermediate counter values into memory storage must then be effected within one cycle of the counter. Due to the high expense for circuitry, one generally dispenses with the possibility of storing all possible intermediate counter values and stores merely two or three counter values.

BRIEF STATEMENT OF THE INVENTION

The object of the present invention is to provide a counter for laser rangefinders which makes it possible to detect all range signals occurring within a measurement cycle.

The invention achieves this object using a method wherein (a) the duration of a measurement cycle is predetermined, (b) the predetermined measurement cycle is divided into time intervals, (c) a storage location in a digital memory is associated with each time interval, (d) a received light pulse reflected by a target is converted into a logic pulse upon impingement at the measuring device and is associated with the logic level for the instantaneously applicable time interval, (e) a corresponding complementary logic level is associated with each time interval during which no light pulse occurs, (f) for each time interval the associated logic level is stored, and (g) the events stored as logic levels in the memory locations are read by a single electronic evaluation means and are further processed.

In one suitable device for carrying out the method, an oscillator in the form of a clock-pulse generator is connected to the clock-driven input of a serial digital memory device; an optical receiver converts impinging light pulses into logic pulses, which are supplied to a second or logic-pulse input of the serial digital memory device; and the output of the serial digital memory device is connected to the microprocessor.

The particular advantage obtained by the invention is that it becomes possible to provide a counter having the capacity to store all possible intermediate counter values at less electronic expense than known from the prior art. The invention completely eliminates any need for an adding-counter module; instead of this, clock pulses from the oscillator can directly control entry into the serial memory of coded information as to whether or not an event has taken place within the measurement period or cycle. Since this information can be accommodated in a single bit, only a depth of memory reduced by the counter resolution is required (for example, one bit instead of 16 bits). The invention can therefore be used to great advantage, particularly when measuring the distance to diffusely reflecting objects in the open, since all measurable distance values are retained and used for the indication.

DETAILED DESCRIPTION

An illustrative embodiment of the invention will be described in detail in conjunction with the accompanying drawings, in which.

Figure 1:
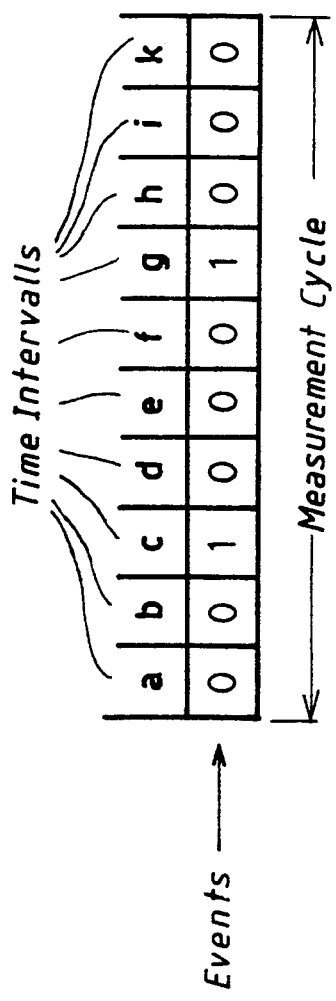
FIG. 1 is a diagrammatic showing of the concept of the method of the invention.

In FIG. 1, a measurement cycle of predetermined duration is illustratively divided into ten time intervals. A sequence of distances, for example of 10 to 100 meters, can be associated, corresponding to the round-trip transit time of reflected light pulses receivable within these time intervals, which are designated a–k. If an event takes place in the form of an impinging target-reflected light pulse within a particular one or more of these intervals, the event is stored as "YES" information or as a target-identifying logic level (1). If no event occurs within a time interval, then the information "NO" or a complementary logic level is stored in the involved time interval.

Figure 2:
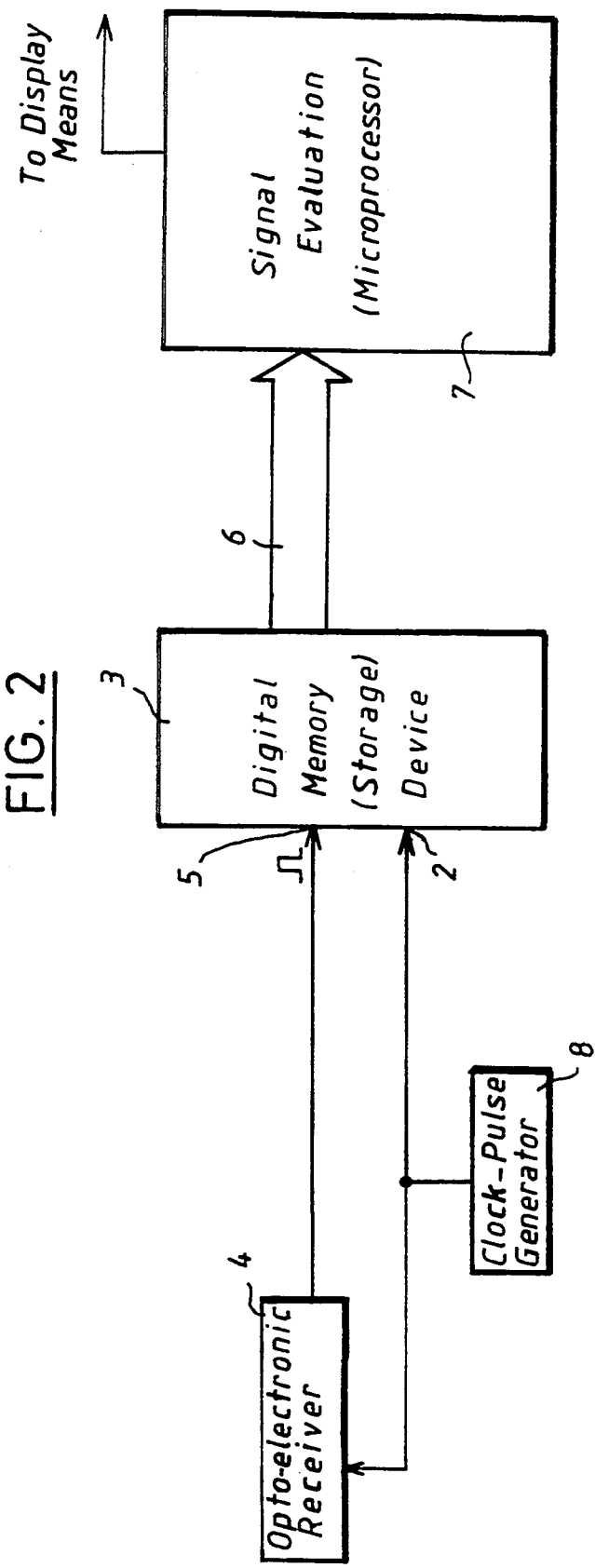
FIG. 2 is a block diagram of a preferred system of the invention for performing the course of a measurement cycle.
Figure 3:
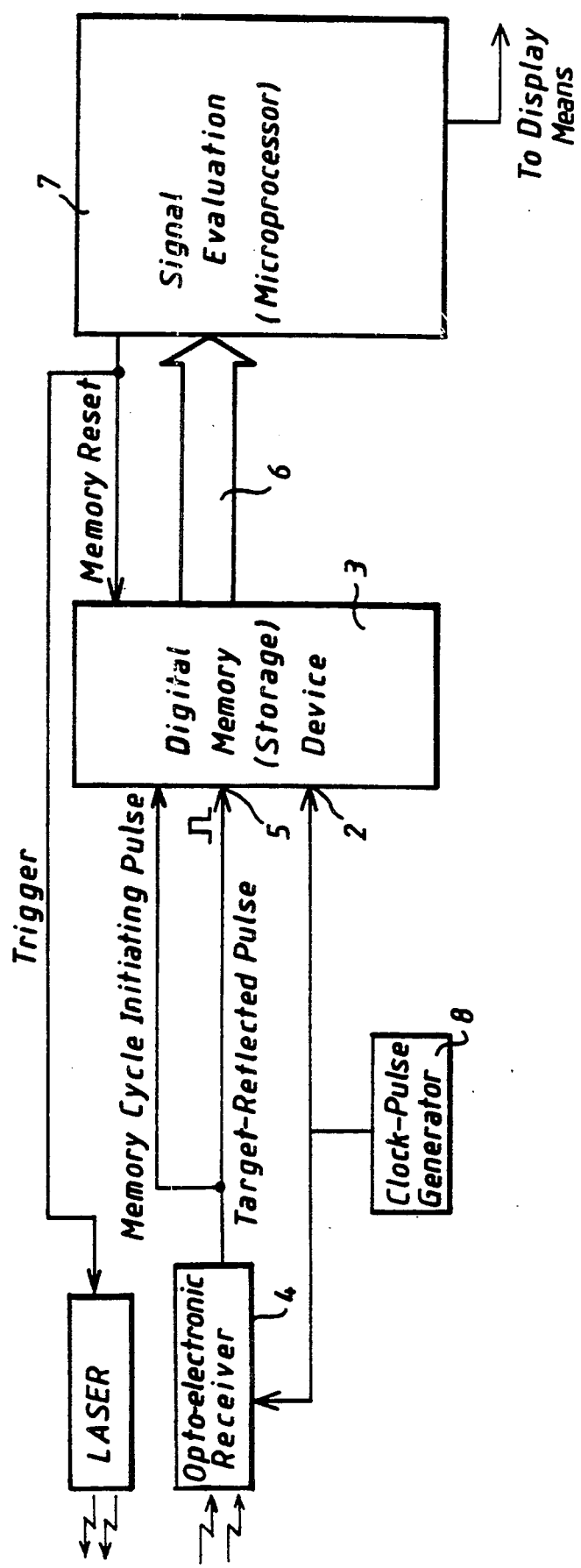
FIG. 3 is a diagram similar to FIG. 2 to show a physical embodiment of the invention.

FIG. 2 shows the course of a measurement cycle. A light pulse sent out by the laser rangefinder commences the measurement process. The length of the time interval is determined by a stable oscillator or clock-pulse generator 8, the clock-pulse output of which is fed to the clock-driven input 2 of a memory or storage device 3. An optical receiver 4 converts into logic pulses the impinging light pulses reflected by the target, and these logic pulses are supplied via a signal-line connection to the data input 5 of the memory device 3. The first pulse from the optical receiver 4 in a measurement cycle is triggered by direct light from the laser transmitter and is used as a memory-cycle initiating pulse. With each clock pulse fed into the clock-driven input 2, the logic level present on the signal line is written in the memory device 3. A known signal-processing electronic system (not shown but illustratively an electronic component of receiver 4 and having a control connection from the clock-pulse generator) assures that the duration of each logic pulse corresponds approximately to the length of a time interval. The information stored in the memory device 3 is read by an electronic signal-evaluation system, for example a microprocessor 7, and can be further processed and/or displayed by known means.

What is claimed is:

1. A method of measuring range to one or more remote targets which method utilizes a light pulse transmitted in the direction of the target and the round-trip transit time of each target-reflected light pulse is measured upon detection at a measuring device, said method comprising the steps of:
   (a) predetermining a duration of a distance measurement period;
   (b) subdividing the distance measurement period into a succession of discrete time intervals;
   (c) establishing a single-bit serial digital memory wherein an individual storage location is associated with each time interval;
   (d) converting each target-reflected light pulse to a logic pulse upon its impingement at the measuring device;
   (e) assigning to the logic pulse of step (d) a first event-identifying logic level that is associated with the instantaneous time interval;
   (f) associating a complementary second logic level with each time interval within which no light pulse is detected;
   (g) storing the logic level associated with each time interval in a different digital-memory location; and
   (h) electronically reading and evaluating the digital memory for such locations as contain the first logic level, thus retaining all measurable distance values of targets and enabling their indication.

2. A method according to claim 1, wherein the length of the time intervals is determined from a clock frequency of an oscillator.

3. A method according to claim 2, wherein the duration of the logic pulse produced from a light pulse corresponds approximately to the length of the time interval.

4. A method of measuring range to one or more remote targets, which method utilizes a light pulse transmitted in the direction of the target and the round-trip transit time of each target-reflected light pulse is measured upon detection at a measuring device, said method comprising the steps of:
   (a) predetermining a duration of a distance measurement period;
   (b) subdividing the distance measurement period into a succession of discrete time intervals;
   (c) establishing a single-bit serial digital memory wherein an individual storage location is associated with each time interval;
   (d) converting each target-reflected light pulse to a logic pulse upon its impingement at the measuring device;
   (e) assigning only to the logic pulse of step (d) an event-identifying logic level that is associated with the instantaneous time interval;
   (f) associating a complementary logic level with each time interval within which no light pulse is detected;
   (g) storing the event-identifying logic level of step (e) in the digital-memory location that is unique to the associated time interval; and
   (h) electronically reading and evaluating the digital memory for such locations as contain the event-identifying logic level, thus obtaining all measurable distance values and enabling their indication.

5. A single-pulse laser range finder, comprising:
   (a) a single-pulse emitter of laser light;
   (b) a receiver for detecting one or more target-reflected light pulses ensuing from an emitted single pulse;
   (c) a clock-pulse generator connected for triggered synchronism with said single-pulse emitter;
   (d) a one-bit serial digital memory device connected to said clock-pulse generator for providing a sequentially indexed succession of storage locations;
   (e) circuit means associated with said receiver and having a synchronizing connection to said clock-pulse generator for converting each detected target-reflected light pulse into a logic pulse of a first logic level;
   (f) said circuit means being connected to said one-bit serial digital memory device for storage of each of said logic pulses at the storage location which is identified with the round-trip laser-light transit time for each detected target-reflected laser-light pulse; and
   (g) electronic distance-evaluating means including a microprocessor connected to read said one-bit serial digital memory device for the memory locations at which logic pulses of the first logic level have been stored, thus retaining all measurable distance values of targets and enabling their indication.

6. The single-pulse laser range finder of claim 5,
   (h) in which said circuit means also generates a different logic pulse of a second logic level for each storage location at which no target-reflected signal has been detected; and
   (i) in which said electronic distance-evaluating means is connected to read only logic pulses of said first level.

* * * * *